(No Model.)

J. McCALLUM.
VEHICLE WHEEL.

No. 352,551. Patented Nov. 16, 1886.

WITNESSES

INVENTOR
James McCallum
Attorney

UNITED STATES PATENT OFFICE.

JAMES McCALLUM, OF ELGIN, ILLINOIS.

VEHICLE-WHEEL.

SPECIFICATION forming part of Letters Patent No. 352,551, dated November 16, 1886.

Application filed June 30, 1886. Serial No. 206,714. (No model.)

*To all whom it may concern:*

Be it known that I, JAMES McCALLUM, of Elgin, in the county of Kane and State of Illinois, have invented certain new and useful Improvements in Carriage and Wagon Wheels; and I do hereby declare the following to be a full, clear, and exact description of the invention, such as will enable others skilled in the art to which it appertains to make and use the same.

My invention relates to an improvement in carriage and wagon wheels, the object of the same being to provide a cheap, firm, and durable wheel, which may be used on any carriage or wagon running-gear.

With these ends in view my invention consists in certain features of construction and combinations of parts, as will be hereinafter fully described, and pointed out in the claims.

Figure 1:
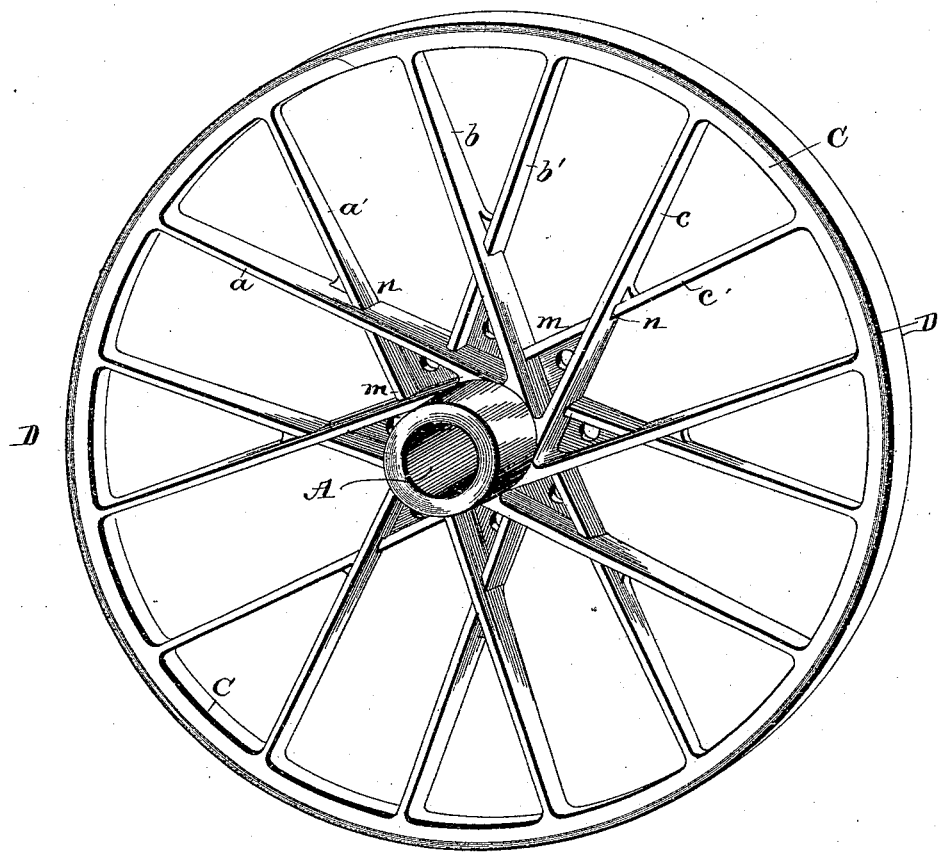
Figure 2:
Figure 3:

In the accompanying drawings, Figure 1 is a view of my improved wheel in perspective. Fig. 2 is a view in transverse section of a T-shaped hollow spoke, and Fig. 3 is a similar view of a right-angle spoke.

A represents a metallic wheel-hub, the interior surface of which is hardened to lessen wear from friction by a chill the size of the axle-skein on which the wheel rotates. The flat or hollow right-angle or T-shaped spokes $a\ b\ c\ a'\ b'\ c'$ are formed integral with the periphery of the hub A, and radiate tangentially from said hub to the rim C, which is formed integral with the outer ends of the said spokes $a\ b\ c\ a'\ b'\ c'$.

The entire wheel is preferably cast integral and the spokes radiate from the hub A in such a manner as to form a thorough bracing for the wheel. Between the hub A and the rim C each spoke intersects two oppositely-radiating spokes—for example, the spokes $a\ b\ c$, radiating in one direction, intersect the spokes $a'\ b'\ c'$, which radiate in an opposite direction, at the point $m$, near the periphery of the hub, and at the point $n$, about midway between the hub and rim. Thus the strain on the wheel at any point is transmitted all over the wheel, so that all points are equally strong.

The rim C is protected from the roughness of the road by a stout metallic tire, D, preferably of steel, which is shrunk tightly thereon. The tire is particularly desirable for use in connection with the metallic wheel, on account of the uniform amount of expansion and contraction which cold and heat produce, since by taking advantage of this phenomenon there is never any loosening of the tire from the wheel.

It is evident that many slight changes might be resorted to in the form and arrangement of the several parts described without departing from the spirit and scope of my invention. Hence I do not wish to limit myself strictly to the construction herein set forth; but, Having fully described my invention, what I claim as new, and desire to secure by Letters Patent, is—

1. A cast-metal vehicle-wheel consisting, essentially, of a chilled hub provided with spokes integral with and radiating tangentially from said hub to the rim of the wheel, substantially as set forth.

2. In a vehicle-wheel, the combination, with the rim and chilled hub, of two oppositely-radiating sets of tangent spokes integral with the hub, and extending from the said hub to the rim and intersecting and attached to each other, substantially as set forth.

3. In a vehicle-wheel, the combination, with the rim and chilled hub, of two oppositely-radiating sets of flat or hollow right-angle T-shaped spokes formed integral with the said parts and radiating tangentially from the hub to the rim, substantially as set forth.

4. In a cast-metal vehicle-wheel, the combination, with the rim and hub, of a series of hollow flat right-angle or T-shaped spokes integral with the hub, for the purpose substantially as set forth.

5. In a cast-metal vehicle-wheel, the combination, with a hub and spokes integral therewith and radiating tangentially therefrom, of a wrought-iron tire shrunk on, for the purpose substantially as set forth.

In testimony whereof I have signed this specification in the presence of two subscribing witnesses.

JAMES McCALLUM.

Witnesses:
THOS. J. RUSHTON,
J. H. WILLIAMS.